July 29, 1941.  H. ANDERSON  2,250,787
FUSIBLE NUT
Filed May 24, 1940
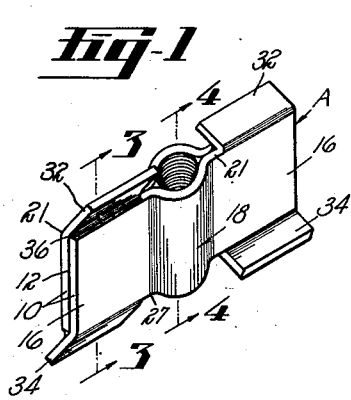
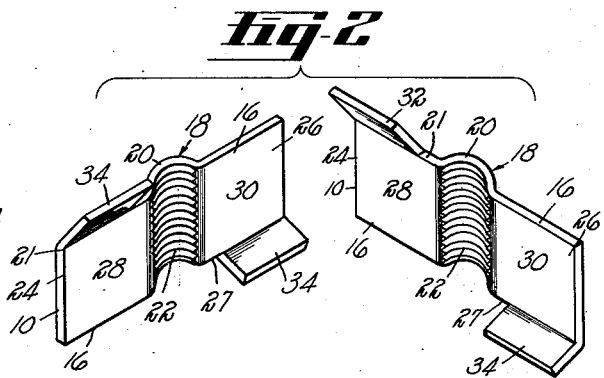
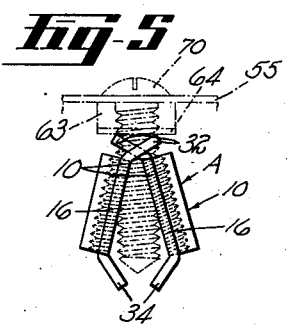
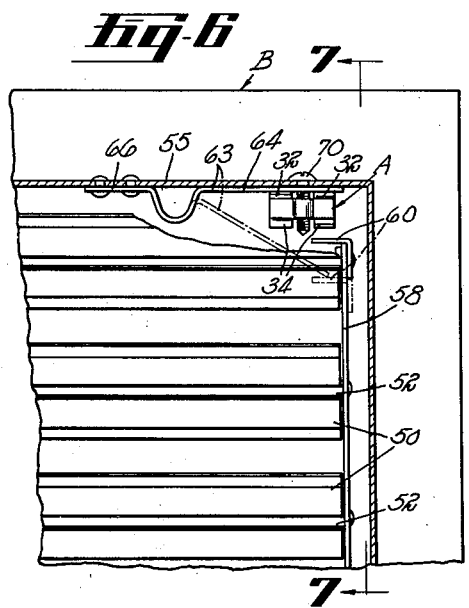
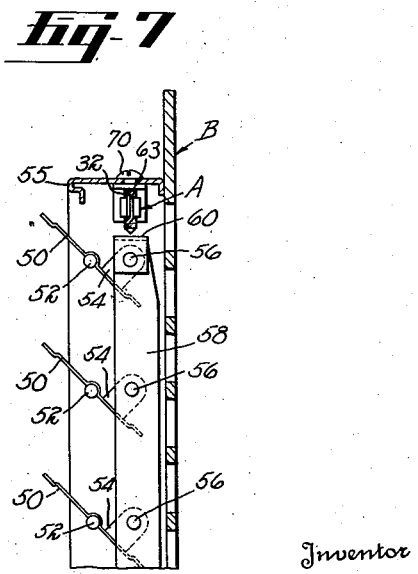
Inventor
HILDING ANDERSON
By Lindsey & Robillard
Attorneys Patented July 29, 1941

2,250,787

UNITED STATES PATENT OFFICE 2,250,787

FUSIBLE NUT

Hilding Anderson, New Britain, Conn., assignor to Tuttle & Bailey, Incorporated, New Britain, Conn., a corporation of Connecticut Application May 24, 1940, Serial No. 337,039

6 Claims. (Cl. 85—32)

The present invention relates to fusible nuts and more particularly to a fusible nut adapted to restrain in inoperative position an actuating member having a constant tendency to move to an operative position.

Heretofore, so far as applicant is aware, fusible nuts generally utilized for the aforementioned indicated purposes are made by drilling and tapping a block of fusible material. This type of nut, being made in its entirety of fusible material, is expensive to produce and, in addition, is not dependable because of the softness of the fusible material. The threads would give way at temperatures considerably less than the temperature at which the material would fuse, thus resulting in failure of the nut and premature operation of the device controlled thereby.

The object of the present invention is to provide an improved and inexpensive nut of the above-indicated type wherein maximum strength is acquired with a minimum amount of fusible material, thus assuring failure thereof at the predetermined desired temperature.

A still further object is a fusible nut wherein a complete release will result at the predetermined desired temperature.

A still further object is to provide a fusible nut which is extremely simple and economical to manufacture and efficient in operation.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawing:

Figure 1 is a perspective view of a nut embodying the invention herein;

Fig. 2 is an exploded view of the nut shown in Figure 1 with the parts thereof in complementing positions;

Fig. 3 is a sectional view of the nut taken along the lines 3—3 of Fig. 1;

Fig. 4 is a sectional view of the nut taken along the lines 4—4 of Fig. 1;

Fig. 5 is a diagrammatic view illustrating the operation of the nut upon failure thereof;

Fig. 6 is a fragmentary view of an air register illustrating one purpose for which the nut may be utilized; and Fig. 7 is a sectional view taken on the line 7—7 of Fig. 6.

Referring to the drawing, the nut A comprises generally a pair of like separable members 10 secured together by a bonding 12 of suitable fusible material to define a threaded screw receiving bore 14 and oppositely disposed gripping or wing members 16.

More particularly, the members 10 are stamped from a suitable relatively hard metal to provide a substantially rectangular body part 18, offset centrally of the ends thereof to provide a half round portion 20 having an inner threaded surface 22, and oppositely disposed wing portions 24 and 26, having their inner surfaces 28 and 30 lying in the same plane and their top and bottom edges disposed at right angles to the axis of the half round portion 20. To facilitate the releasing of the nut and spread the members apart upon the fusing of the fusible material, the upper or top edge 21 of the wing portion 24 is provided with a releasing or spreading plate 32 extending inwardly therefrom at an obtuse angle to the inner surface 28, and the wing portion 26 is provided with a like plate 34 arranged on the lower edge 27 thereof and diagonally opposite plate 32. With this arrangement, when the members 10 are assembled with the inner surface 28 of the wing portion 24 of one member disposed in mating engagement with the inner surface 30 of the wing portion 26 of the opposite member, the diagonally opposite releasing or spreading plates 32 and 34 of each member will respectively overlie the diagonally opposite top and bottom straight edges of the other members. Thus, as clearly seen in Fig. 1, the cooperating straight edges and overlying spreading plates are alternately disposed to opposite sides of the nut.

The securing of the members 10 is accomplished by applying the fusing material over the mating inner surfaces 28 and 30, thus obtaining a large bonding surface securely holding the members together with a minimum amount of material and substantially reducing the cost of manufacture as compared to previous practices. In order to give the nut greater strength, a fillet 36 of solder may also be formed in the angle between each spreading plate and the underlying straight edge.

As previously indicated, the nut is particularly suitable for restraining in operative position an actuating member having a tendency to move to an inoperative position. To more clearly illustrate this, there is shown in Figs. 6 and 7 an air register B commonly used in ventilating systems. The register B includes a frame 55 supporting a plurality of cross bars 52 between the side members thereof, and each bar 52 has pivotally mounted thereon a vane 50 adapted to pivot thereon into open and closed position. In order to simultaneously pivot the vanes, each vane is provided with a rearwardly extending ear 54 adapted to receive a stud 56 carried by a common vertically arranged control lever 58. Obviously, when the bar is in the position shown in Figs. 6 and 7, the vanes are open, and when the bar is moved downwardly therefrom, the vanes will close. In order to automatically close the register, the upper end of the bar 58 carries thereon an inwardly and laterally extending abutment 60 and the frame 55 carries an actuating member 63 adapted to cooperate with abutment 60 and move the vanes to closed position. In the embodiment illustrated, the actuating member 63 comprises a spring 64 having its inner end 66 riveted to the top member of the frame and its outer end, due to the inherent resiliency thereof, free to move in the arc of a circle and engage abutment 60.

To maintain the spring 64 in its inoperative position, the frame is further provided with a stud 70 which extends through a slot in the spring and is threaded to receive a fusible nut A. When so held, the end of the spring 64 will have a constant tendency to move to inoperative position, thus exerting a constant downward force on the releasing or spreading plates 32 and 34 of the nut A. However, inasmuch as the pull of the screw is at right angles to the soldered wings, the nut will withstand almost any pressure and the threads will not give way under the constant pressure of the spring 64.

When so held, if a fire should occur, the nut A will maintain the spring in its inoperative position until the temperature has risen to the fusing point of the solder. At this temperature, the solder will lose its bonding characteristics and the downward force of the spring 64 on the plates 28 and 30 will cause same to pivot about the straight edges underlying them (as seen in Fig. 5), thus not only separating the members but also releasing the threads thereof from the threads of stud 70 and thereby throwing the nut members 10 clear of the stud. With the nut A removed, the spring end will move downwardly until it engages with abutment 60 whereupon it will move the lever 58 to the dotted position shown in Fig. 6, whereupon the vanes of the register will be closed.

It is obvious that the particular embodiment of the nut A shown and described herein is reversible and that the spring 64 will engage one of the spreading plates in any angular position of the nut on the stud and the spring 64 need not be in alignment with the stud but may be to one side or the other thereof. In many embodiments, however, it will not be necessary to make the nut reversible or to arrange spreading plates on both members, for if one member 10 is arranged with the camming plate overlying the straight edge of the other member, the same pivoting or spreading action will result, thus spreading the members upon the fusing of the bonding material. Moreover, when not used in conjunction with a spring loaded member, the nut will generally be screwed with sufficient tightness against a fixed member to exert a pressure on the spreading plates which will, when the bonding material fuses, tend to split the members and cause the nut to divide as indicated above.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A fusible nut comprising a pair of separable members of relatively hard metal bonded by a material adapted to fuse at a predetermined temperature, said members defining therebetween a central threaded bore and wings extending outwardly to either side of said bore, the upper edge of each member having a spreading plate to one side of the bore and a straight edge to the other side of said bore, said members being so arranged that the spreading plate of each member overlies the straight edge of the other member.

2. A fusible nut comprising a pair of separable members of relatively hard metal bonded together by a material adapted to fuse at a predetermined temperature, the edge of one of said members having a spreading plate extending therefrom and overlying the edge of the other of said members.

3. A fusible nut comprising a pair of separable rectangular members of relatively hard metal bonded together by a material adapted to fuse at a predetermined temperature, said members defining therebetween a centrally arranged threaded bore, one of said members being provided with a spreading plate on its upper edge overlying the upper edge of the other member.

4. A fusible nut comprising a pair of separable rectangular members of relatively hard metal bonded together by a material adapted to fuse at a predetermined temperature, said members defining therebetween a centrally arranged threaded screw receiving bore, the upper edge of one of said members having a spreading plate extending angularly therefrom to overlie the straight edge of the other member.

5. A fusible nut comprising a pair of separable rectangular members of relatively hard metal bonded together by a material adapted to fuse at a predetermined temperature, each of said members having a half round central portion defining therebetween a cylindrically threaded screw receiving bore, each of said members having a plate extending angularly from the upper edge thereof to one side of the bore and a straight edge to the other side of the bore, said members being so arranged that the plate of one overlies the straight edge of the other.

6. A fusible nut comprising a pair of separable blanks, each blank having a half round cylindrical central portion with an inner threaded surface and a pair of rectangular wing portions extending therefrom and having flat inner surfaces lying in the same plane, the diagonally disposed top and bottom edges of each wing portion having plates extending therefrom at an obtuse angle to the inner surfaces thereof and the other diagonally disposed top and bottom edges being straight, said blanks being so arranged that the plates of one overlie the straight edges of the other, and a bonding of fusible solder securing said members and disposed between the flat inner surfaces thereof and the plate of each blank and the corresponding straight edge of the other member.

HILDING ANDERSON.